United States Patent [19]
Thornton et al.

[11] Patent Number: 4,783,362
[45] Date of Patent: Nov. 8, 1988

[54] PEEL PLY MATERIAL

[75] Inventors: Peter B. Thornton, Bronxville; Stanley H. Cone; George W. Booz, both of Hornell, all of N.Y.

[73] Assignee: Stern & Stern Industries, Inc., New York, N.Y.

[21] Appl. No.: 103,226

[22] Filed: Sep. 30, 1987

[51] Int. Cl.$^4$ .............................................. D03D 13/00
[52] U.S. Cl. ................................ 428/224; 422/225; 422/224; 422/257; 422/258; 422/254; 422/402
[58] Field of Search ............ 428/224, 225, 229, 257, 428/258, 259, 408, 420, 421

[56] References Cited

U.S. PATENT DOCUMENTS

| | | | |
|---|---|---|---|
| 2,372,868 | 4/1945 | Warren, Jr. | 57/146 |
| 2,655,459 | 10/1953 | Gordon et al. | 154/110 |
| 3,288,175 | 11/1966 | Valko | 139/425 |
| 3,349,157 | 10/1967 | Parsons | 264/255 |
| 3,586,597 | 6/1971 | Okuhashi | 161/87 |
| 3,986,530 | 10/1976 | Maekawa | 139/425 R |
| 4,113,907 | 9/1978 | Hoage et al. | 428/259 |
| 4,173,678 | 11/1979 | Hennes et al. | 428/364 |
| 4,295,907 | 10/1981 | Cordts et al. | 156/246 |
| 4,368,234 | 1/1983 | Palmer et al. | 428/408 |
| 4,369,816 | 1/1983 | Payen | 428/259 |
| 4,370,390 | 1/1983 | Burk | 428/408 |
| 4,388,365 | 6/1983 | Hasegawa | 428/259 |
| 4,410,577 | 10/1983 | Palmer et al. | 428/408 |
| 4,565,595 | 1/1986 | Whitener | 156/156 |
| 4,606,968 | 8/1986 | Thornton et al. | 428/229 |

OTHER PUBLICATIONS

Conductive No Shock Nylon Fiber–Monsanto Brochure.
Leader in Conductive Fibers–Badische Corporation Brochure.

*Primary Examiner*—James J. Bell
*Attorney, Agent, or Firm*—Amster, Rothstein & Ebenstein

[57] ABSTRACT

A peel ply material of high visual discernibility for use during curing of a resin-coated substrate comprises a base fabric characterized by a high level of wet out when disposed on a cured resin-coated substrate, and tracers woven into the base fabric in spaced lines comprising yarn characterized by (a) a low level of wet out, (b) substantially the same heat shrinkage properties as the base fabric, and (c) a substantially zero transfer level to the resin-coated substrate. The base fabric may be undyed polyester, and the tracers may be bleached polyfluorocarbon or conjugated polyester/carbon.

17 Claims, 1 Drawing Sheet

PEEL PLY MATERIAL

BACKGROUND OF THE INVENTION

The present invention relates to peel ply materials, and in particular to a peel ply material of high visual discernibility for use during curing of a resin coated substrate.

In constructing an article, such as the wing surface of a F-18 Hornet fighter jet airplane, one may wish to use a multi-layer laminate (for example, a 24 layer laminate) having alternating layers of a thermosetting or thermoplastic resin and a graphite or fiberglass substrate. The resin is typically an epoxy or polyimide. Curing is typically done by a combination of heat and pressure over time—for example, about 350° F. and 300 psi over 24 hours. During laying down of the layers of the laminate, air becomes entrapped and, during the curing process, this entrapped air, as well as any gases evolved during the curing reaction, must be purged. If all 24 layers were cured at once, it would be impossible for the gas to escape from the lower layers through the upper layers. Accordingly, a laminate of fewer layers (typically four layers) is first individually formed and cured to start a stack of cured laminates; thereafter successive layers of laminates are placed one on top of the other (four at a time) and cured (four at a time) in turn to increment the stack until it becomes a cured 24 layer laminate.

It is well recognized that successive layers of laminates will not stack and bind properly to the cured stack unless the top surface of the cured stack is sufficiently rough (that is, not smooth). In order to create this roughness, during curing of the four layer laminate a peel ply material in the form of a textured fabric is typically applied over the top of the upper layer; after curing of the four layer laminate, the peel ply material is peeled off and thrown away to reveal the rough or textured upper surface of the laminate stack which will then bind properly with the bottom of the next four layers of laminate placed on top. The peel ply material is typically nylon or polyester.

It will be appreciated that even where the entire stack of laminates is being cured simultaneously, a peel ply layer is still required on top to enable subsequent surface treatment such as an application of paint, a radar or lightning-absorbing coating, etc.

Various layers of porous material (e.g., breather and ventilating plies and a caul plate) are placed over the peel ply, these layers of porous material being covered with a non-porous vacuum sealing material called a bag. The combination of pressure on top of the sealing material, vacuum below the sealing material, and heat to the stack effects curing. After curing, the peel ply, porous and sealing layers are removed.

In practice, however, the semi-skilled labor overseeing the lamination process frequently forget to remove the peel ply material. This is understandable because the peel ply material is typically white to begin with and "wets" or becomes transparent (and therefore assumes the color of the resin from the laminate) so that it is hard to detect on the cured resin. The presence of the peel ply material in the final 24 layer laminate severely weakens the structure physically since there is a very poor bond between the peel ply material and the resin. At this stage if the peel ply material is discovered within the finished laminate, the finished laminate (which may be worth several million dollars) must be discarded.

A peel ply material must not only be inert to the chemicals (such as the resin), temperatures and pressures involved in the laminating or curing process, but also have a zero transfer level to the resin-coated substrate (i.e., have no ingredients which separate from the peel ply material and otherwise contaminate the laminate).

One proposed solution to the problem is to color the peel ply material with dyes contrasting with the resin, either overall or in patterns—e.g., with printing saying "remove me!". The problem is that the coloring dyes tend to come off or transfer onto the resin and themselves become contaminants as bad as trapped gas. The obvious solution to the contamination problem—to print only on the upper face of the peel ply material so that the lower face contacting the resin could not contaminate it—does not work; unfortunately, the same people who frequently forget to remove the peel ply material from the stack will occasionally apply the wrong surface of the peel ply material to the resin, thus resulting at least in print contamination of the stack and possibly failure to remove the peel play layer as well. Another proposed solution is to not color the entire material, but only employ trace threads (very thin, widely spaced apart stripes or grids of dyed fibers) so there is very little dye to contaminate the laminate; actually in most instances, but not all, this works fairly well if a moderate transfer level is acceptable for the particular application intended. A theoretical solution is to use tracer threads composed of a material of a naturally contrasting color which will not contaminate the laminate because it has no dyes; the problem with this solution is that the known suitable trace threads have different heat shrinkage properties than the materials used in the laminates, thereby resulting in premature separation of the peel ply layer from the remainder of the laminate during curing, deformation of the surface texture, and/or interference in the controlled outgassing process for curing.

Thus, a need remains for a peel ply material of high visual discernibility which combines a base fabric characterized by a high level of wet-out when disposed on the cured resin-coated substrate and tracers exhibiting a low level of wet-out, substantially the same shrinkage rate as the base fabric, and a substantially zero contamination transfer level to the resin-coated substrate. To reduce labor costs, the peel ply material should also be sufficiently economical that it may be used once and discarded.

Accordingly, it is an object of the present invention to provide a peel ply material of high visual discernibility comprising a base fabric characterized by a high level of wet-out and tracers, woven into the base fabric, characterized by a low level of wet-out.

Another object is to provide such a peel ply material wherein the tracers exhibit substantially the same heat shrinkage properties as the base fabric and a substantially zero transfer level to the resin-coated substrate.

A further object is to provide such a peel ply material which is sufficiently economical for one-time use only.

It is also an object to provide such a peel ply material which is inert to the chemicals, temperatures and pressures used in the curing process.

SUMMARY OF THE INVENTION

It has now been found that the above and related objects of the present invention are obtained in a peel ply material of high visual discernibility for use during curing of a resin-coated substrate. The peel ply material comprises a base fabric characterized by a high level of wet out when disposed on a cured resin-coated substrate, and tracers woven into said base fabric in spaced lines. The tracer comprises yarn characterized by (a) a low level of wet out, (b) substantially the same heat shrinkage properties as the base fabric, and (c) a substantially zero transfer level to the resin-coated substrate.

In a preferred embodiment the base fabric is undyed polyester and the tracers are bleached fluorocarbon, whereby the base fabric is white and the tracers are white. Alternatively, the base fabric is undyed polyester and the tracers are conjugated polyester/carbon, whereby the base fabric is white and the tracers are dark. Alternatively, the base fabric is fiberglass and the tracers are aramid.

The tracers may comprise two sets of yarn, a first set of yarn at spaced lines and a second set of yarn in spaced lines. If the first and second sets of yarn are of contrasting color to each other, the peel ply material is adapted for universal use on resin-coated substrates of any color. The first and second sets of yarn are preferably oriented at right angles to each other, and the spaced lines are generally 0.5–2.0 inches apart. The first set of yarns may comprise bleached polyfluorocarbons and the second set of yarns may comprise conjugated polyester/carbon.

Preferably the base fabric is a basket weave, and more particularly a 2×2 basket weave. It is textured, porous and not permanently adherent to (i.e., peelable from) the resin-coated substrate. A preferred base fabric is woven from 150/34/4z polyester yarn in the warp and 150/34/0 polyester yarn in the woof or fill. Preferred tracers are 150/34/0 polyester and 20/6/0 conjugated polyester/carbon plied 7z, 225/30/0 bleached polyfluoroethylene, and 200/134/0 aramid. The peel ply material is preferably woven at a density of approximately 70 ends/inch and 65 picks/inch on the loom. The conjugated polyester/carbon preferably comprises co-extruded undyed polyester and carbon.

BRIEF DESCRIPTION OF THE DRAWING

The above brief description, as well as further objects and advantages of the present invention, will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 2:
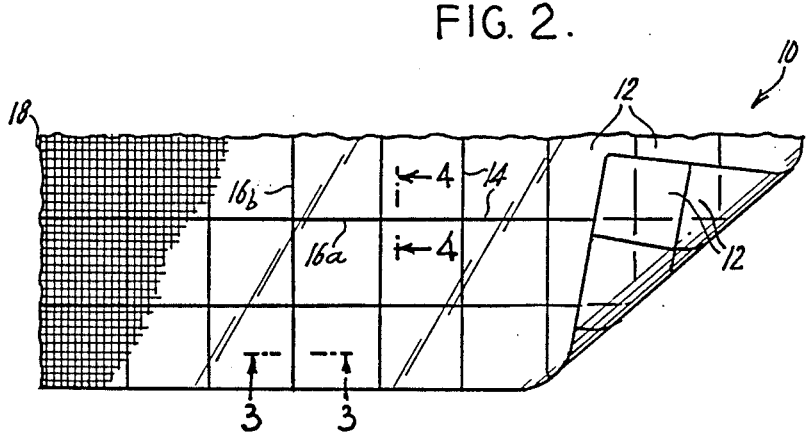
FIG. 2 is a fragmentary top plan view of a sheet of the peel ply material of the present invention, the lower right hand corner being rolled upwardly to reveal the under surface and the left portion showing the peel ply material as it appears on it a cured resin-coated substrate.

Referring now to the drawing and in particular to FIG. 2 thereof, therein illustrated is a peel ply material according to the present invention, generally designated by the reference numeral 10. The peel ply 10 is characterized by a high discernibility and is adapted for use during the heat and pressure curing of a resin-coated substrate, as will be explained in further detail hereinbelow. The peel ply material 10 is comprised generally of a base fabric 12 and tracers 14 woven into the base fabric 12 in spaced lines 16.

The base fabric 12 of the present invention is conventional in nature and therefore exhibits a high level of wet out so that it is essentially invisible against the cured resin-coated substrate (see the left side of FIG. 2). It is textured, porous and non-adherent to the resin-coated substrate. The most popular materials for peel plies are the commercially available heat-cleaned and scoured nylon, heat-cleaned light-weight fiberglass, and the suitable undyed polyester release fabrics. The base fabric 12 is selected to provide in the peel ply material 10 the desired levels of texture and permeability. The texture provides the roughness desired in the upper face of the laminate after curing, and the permeability enables a vacuum to be drawn through the peel ply material and gases to escape therethrough. The coarseness of the weave and the strength of the fabric will vary with the application. While coarse weaves may be employed which require secondary sanding operations to refine texture, finer weaves generally avoid such secondary sanding operations. A basket or square weave is preferred, especially a 2×2 basket weave. While the 2×2 basket weave offers the advantages of providing a desirable level of bias and the ability of the base fabric material to be used with either side down and/or turned 90° in orientation (to simplify application of the peel ply material to the laminate stock). Other weaves such as a 3×1 twill may also be satisfactory. The weave determines the permeability of the peel ply material which, in turn, should vary with the type of resin employed. A very fluid resin requires a rather tight weave, whereas a viscous resin enables use of a rather looser weave.

A preferred base fabric 12 is woven 150/34/4z (that is, 150 denier, 34 filaments, 4 turns per inch, with a z twist) undyed polyester yarn in the warp and 150/34/0 undyed polyester yarn in the fill. Clearly other yarn parameters may be utilized, including those presently used for the yarn of base fabrics. The undyed polyester utilized for the base fabric is a grayish white with a very high level of wet-out when disposed on a cured resin-coated substrate 18. The undyed polyester is available from Dupont and may be any polyester previously used for peel ply purposes or similar materials.

The tracers 14 woven into the base fabric 12 to afford high visual discernibility to the resultant peel ply material 10 must be selected with both the base fabric 10 and the resin-coated substrate 18 in mind. For example, when the base fabric is undyed polyester and therefore white, the tracers may be bleached polyfluorocarbon and therefore a very bright white or conjugated polyester/carbon and therefore a dark black. In both instances, the heat-shrinkage properties of the tracers 14 correspond roughly to those of the undyed polyester base fabric 12 and in both instances the contaminant transfer level from the tracers 14 to the resin-coated substrate 18 is substantially zero. The polyfluorocarbon tracers 14 would be preferred for use in conjunction with dark resin-coated substrates 18, so that the white tracers stand out, while the conjugated polyester/carbon tracers 14 would be preferred for use in conjunction with light resin-coated substrates 18, so that the black tracers stand out. The polyfluorocarbon is formed from a slit film or from a bleached multifilament as it is naturally brown. The polyfluorocarbon is available from a variety of different sources, in an unexpanded form from Dupont under the tradename Teflon and in an expanded form from Gore under the tradename V111321 Goretex.

While the aforementioned peel ply materials are useful where an appreciable heat-shrinkage level is desired, other peel ply materials of the present invention find utility where the heat-shrinkage level is less appreciable. For example, the base fabric 12 may be fiberglass and the tracers 14 may be aramid (available from Dupont under the trade name Kevlar), both materials possessing almost negligible heat-shrinkage levels. As aramid is yellow, such a peel ply material is suitable for both light and dark resin-coated substrates.

As an example of the tracers utilizable in the present invention, the dark tracer may be formulated as 150/34/0 polyester and 20/6/0 conjugated polyester/carbon, plied 7z; the light heat-shrinking tracer may be formulated as 225/30/0 bleached polyfluoroethylene yarn; and the yellow non-shrinking peel ply material aramid tracer may be formulated as 200/134/0 Kevlar 29 yarn.

The tracers 14 may be woven into the base fabric 12 as a plurality of spaced lines 16 in either the warp or woof. Generally the lines 16 are parallel to one another and regularly spaced apart, preferably by 0.5–2.0 inches. If desired, the tracers 14 may be disposed in a rectangular or plaid pattern formed of lines 16 extending along both the warp and woof.

In the peel ply material illustrated in FIG. 2, the tracers 14 comprise two sets of yarn, a first set in spaced lines 16a along the woof and a second set of yarn in spaced lines 16b along the warp. The first and second sets of yarns are of contrasting color to each other, for example, the base fabric may be undyed polyester, one set of yarn bleached polyfluorocarbon, and the other set of yarn conjugated polyester/carbon. The resultant peel ply material 10 is adapted for universal use, that is, for use on resin-coated substrates of any color. When used on white resin-coated substrates, the lines 16b formed of the dark conjugated polyester/carbon will stand out; when used on dark resin-coated substrates, the lines 16a of bleached polyfluorocarbon will stand out. While the orientation of the first and second sets of yarn has been illustrated as being at right angles to each other, obviously other angles may be employed and, indeed, the two sets of yarns may be parallel, the lines of one set alternating with the lines of the other. It will be appreciated that while the lines 16a and 16b of FIG. 2 are both shown as black lines, one represents a dark yarn and the other represents a light yarn.

A preferred peel ply material according to the present invention is woven at a density of approximately 70 ends/inch and approximately 65 picks/inch on the loom, although these parameters may increase slightly after processing of the yarn.

Figure 3:
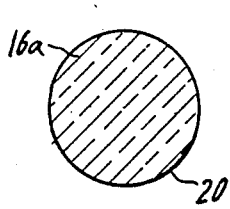
FIG. 3 is a cross-sectional view of one of the filaments taken along the line 3—3 of FIG. 2.
Figure 4:
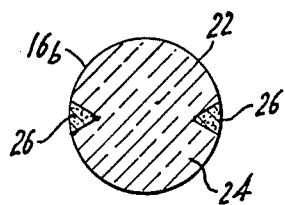
FIG. 4 is a cross-sectional view of one of the filaments taken along the line 4—4 of FIG. 2.

Referring now to FIGS. 3 and 4, therein illustrated in greatly magnified form are, respectively, a cross-section of a filament 20 of the bleached polyfluorocarbon of line 16a and what is believed to be a cross-section of the filament 22 of a conjugated polyester/carbon formed from a co-extruded undyed polyester 24 and carbon black 26. It is believed that continuous wedges of the carbon black actually enters into the sides of the polyester filament so that the carbon black is not thereafter separable from the polyester and does not contribute any contamination to the resin-coated substrate 18. The carbon black wedges 26 may be larger than those illustrated and may even actually contact one another in the middle of polyester 24, forming an equatorial layer.

It will be appreciated that the term "conjugated polyester/carbon," as utilized herein and in the claims, encompasses not only this co-extruded polyester and carbon black, but also polyester which has been doped, coated or otherwise treated with carbon black in a manner which provides a substantially zero transfer level of the carbon black to the resin-coated substrate.

The peel ply material according to the present invention is utilizable in bag molding fiber-reinforced organic matrix composites and bonded structures. The molding methods include vacuum bag, pressure bag and autoclave molding. Bags, the thin and flexible membranes or silicone rubber shapes, separate the laid-up constructions or laminates from the pressurizing gases during the composite cures. The bagged lay-ups in autoclaves are usually vented to pressures lower than those applied to the bag. Curing may be achieved through the application of pressure, heat, induction, dielectric, microwave, xenon flash, ultraviolet, electron beam and gamma radiation. Pressure bag molding conditions may attain routinely 350° F. (177° C.) and 300 psi.

The resin-coated substrates may include one or more thermoplastic and/or thermosetting resin compositions such as polyimide, rubber-modified epoxies, phenolics, polyesters and the like as the resin or matrix material, and commercial fiber reinforcements such as glass, aramid, graphite and boron fiber as the substrate.

Figure 1:
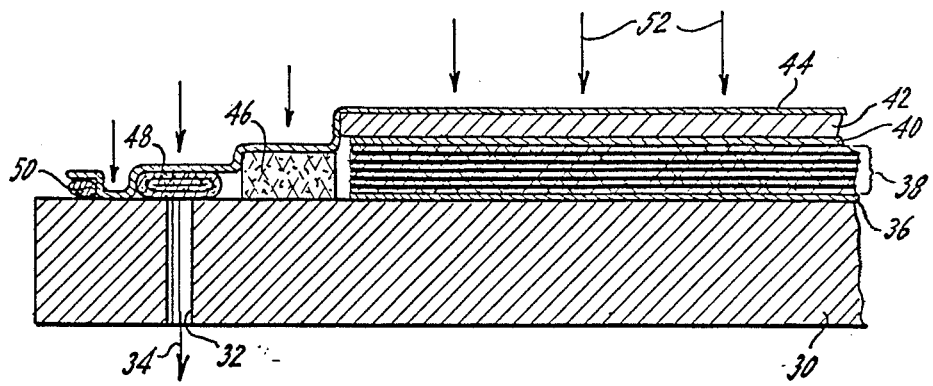
FIG. 1 is a schematic cross-sectional view of the peel ply material in use during curing of a laminate.

Referring now to FIG. 1, therein illustrated is a simplified schematic view of an autoclave molding apparatus with a vertical bleeder. A mold plate 30 is provided with an atmospheric or vacuum vent 32 for the withdrawal of air, fluid, and the like in the direction of arrow 34. A release layer or sacrificial ply 36 (which may be of peel ply material) is disposed immediately over the top of the mold plate 30, and a stack 38 of resin-coated substrates is disposed over the release or sacrificial ply 36. A layer 40 of the peel ply material 10 of the present invention overlies the top of the stack 38. A caul or insulating plate 42 is disposed over the peel ply layer 40 to provide protection against sharp temperature increases, prevent local purging of resin during pressurization, and insure a smooth, non-wavy surface. Various venting plies (not shown) and breather plies (not shown) may be disposed on either side of the caul plate 42. Finally, a bag 44 is disposed over the caul plate 42 in the region of the stack 38 and extends over the flexible dam 46 to one side thereof, over the edge bleeder 48 (disposed over the vent 32 to prevent blockage thereof) and over the bag seal 50. During curing by this process, pressure is applied downwardly on the bag, as indicated by the arrows 52 concurrently with heat, to effect curing, trapped air and excess resin being removed through the vent 32 by the vacuum or lower pressure applied to the vent 32.

After curing is completed, the bag 44, caul plate 42, and any venting or breather plies are removed to expose the peel ply layer 40. The layer 40 of peel material 10 manifests itself by the presence of lines 16a, 16b or the rectangular pattern formed by both on the upper surface of the resin-coated fabric at the top of the stack. It will be appreciated that these lines are visible regardless of the orientation of the peel ply material (that is, whether it was applied in one direction or in the transverse direction) and regardless of whether one surface or the other of the peel ply material is facing upwards.

While the use of tracers increases the cost of the peel ply material, the peel ply material remains sufficiently economical for one-time use only.

To summarize, the present invention provides a peel ply material of high visual discernibility which combines a base fabric characterized by a high level of wet-out when disposed on a cured resin-coated substrate and tracers exhibiting a low level of wet-out, substantially the same shrinkage rate as the base fabric and a substantially zero transfer level to the resin-coated substrate. The peel ply material is inert to the chemicals, temperatures and pressures used in the curing process and is sufficiently economical for one-time use only.

Now that the preferred embodiments of the present invention have been shown and described in detail, the various modifications and improvements thereon will become readily apparent to those skilled in the art. Accordingly, the spirit and scope of the present invention is limited only by the appended claims, and not by the foregoing description.

We claim:

1. A peel ply material of high visual discernibility for use during curing of a resin-coated substrate comprising:
   (A) a base fabric characterized by a high level of wet out when disposed on a cured resin-coated substrate; and
   (B) tracers of a color affording high visual discernibility against the cured resin-coated substrate woven into said base fabric in spaced lines comprising yarn characterized by (a) a low level of wet out, (b) substantially the same heat shrinkage properties as said fabric, and (c) a substantailly zero transfer level to the resin-coated substrate.

2. The peel ply material of claim 1 wherein said base fabric is undyed polyester and said tracers are bleached polyfluorocarbon, whereby said base fabric is white and said tracers are white.

3. The peel ply material of claim 1 wherein said base fabric is undyed polyester and said tracers are conjugated polyester/carbon, whereby said base fabric is white and said tracers are dark.

4. The peel ply material of claim 1 wherein said base fabric is fiberglass and said tracers are aramid.

5. The peel ply material of claim 1 wherein said tracers comprise two sets of yarn, a first set of yarn in spaced lines and a second set of yarn in spaced lines; said first and second sets of yarn being of contrasting color to each other, whereby said peel ply material is adapted for universal use on resin-coated substrates of any color.

6. The peel ply material of claim 5 wherein said first and second sets of yarn are oriented at right angles to each other.

7. The peel ply material of claim 5 wherein said first set of yarns comprises bleached polyfluorocarbons and said second set of yarns comprises conjugated polyester/carbon.

8. The peel ply material of claim 1 wherein said base fabric is a basket weave.

9. The peel ply material of claim 8 wherein said base fabric is a 2×2 basket weave.

10. The peel ply material of claim 1 wherein said base fabric is woven from 150/34/4z polyester yarn in the warp and 150/34/0 polyester yarn in the fill.

11. The peel play material of claim 1 wherein said tracers are 150/34/0 polyester and 20/6/0 conjugated polyester/carbon plied 7z.

12. The peel ply material of claim 1 wherein said tracers are 22/30/0 bleached polytetrafluoroethylene.

13. The peel ply material of claim 1 wherein said tracers are 200/134/0 aramid.

14. The peel ply material of claim 1 wherein said material is woven at a density of approximately 70 ends/inch and 65 picks/inch on the loom.

15. The peel ply material of claim 3 wherein said conjugated polyester carbon comprises co-extruded undyed polyester and carbon.

16. The peel ply material of claim 1 wherein said spaced intervals are 0.5–2.0 inches.

17. The peel ply material of claim 1 wherein said base fabric is textured, porous and non-adherent to the resin-coated substrate.

* * * * *